April 6, 1943. R. S. ELBERTY, JR 2,315,511
ADJUSTABLE SPEED DRIVES
Filed Oct. 19, 1940 2 Sheets-Sheet 1

WITNESSES:
James F. Young
Mrs. C. Groome

INVENTOR
Robert S. Elberty, Jr.
BY
Paul E. Friedemann
ATTORNEY

April 6, 1943.   R. S. ELBERTY, JR   2,315,511
ADJUSTABLE SPEED DRIVES
Filed Oct. 19, 1940   2 Sheets-Sheet 2

WITNESSES:
James F. Young
Nr. C. Groome

INVENTOR
Robert S. Elberty, Jr.
BY
Paul E. Friedmann
ATTORNEY

Patented Apr. 6, 1943

2,315,511

UNITED STATES PATENT OFFICE 2,315,511

ADJUSTABLE SPEED DRIVE

Robert S. Elberty, Jr., Waynesboro, Pa., assignor to Landis Tool Company, Waynesboro, Pa.

Application October 19, 1940, Serial No. 361,925

7 Claims. (Cl. 172—239)

My invention relates to adjustable speed drives, particularly for use on machine tools, and contemplates the use of a series motor and a series generator in a variable voltage drive combination. While the series motor is well known and in general use for certain types of work, the series generator was discarded years ago because of certain characteristics which at that time were considered undesirable, in addition to which there was only a very limited use for such a generator.

One of the undesirable characteristics of the series generator was that as the load increased, the voltage increased. However, it has been found that for certain types of work a constant speed of a driving motor is desirable under all load conditions. By providing a properly proportioned winding in the generator and by matching the motor to the generator, it was found that this result could be obtained by taking advantage of the rising voltage characteristic of a series generator. Applicant first accomplished this result with a compound wound generator and motor, as disclosed in his co-pending application Serial No. 238,657, filed November 3, 1938, and entitled Adjustable speed drives.

When series equipment was used instead of compound, it was found that speed regulation was very poor, particularly at light loads or slow speeds or both. Under these conditions, a series motor tends to exceed the selected speed. After considerable investigation it was found that this instability was due to high residual magnetism in the armature and field of the generator. By a high residual magnetism is meant, in this case, a residual magnetism equal to 10% or more of the no-load saturation. It was probably for this reason that previous series combinations never worked satisfactorily. Series motors having a low residual magnetism were available but this characteristic was only incidental in their construction, and was never utilized. It was found that when a motor of this type was used as a generator in a series type variable voltage drive, the defect of instability was corrected. Thus by using a magnetic material having a low enough residual magnetism, reduction in load would not result in an increase in motor speed. As indicated by the above definition of a high residual magnetism, a low residual magnetism is defined here as of a value less than 10% of the value at no-load saturation.

A speed control resistor serves to adjust the excitation of both the generator field and the motor field. For this purpose a portion of the resistor is connected in parallel with the motor field. By a novel arrangement of control elements, this connection may be changed to a series connection and the series field of the motor reversed when the motor and generator are disconnected so that the current generated by the motor at this time will be limited by the resistor and the motor rotation stopped.

Another device for speed control peculiar to a series type variable voltage drive consists of separate resistors for the motor and generator which are operated successively by a single operating arm. The effect of this method of speed control is to develop more power at intermediate speeds.

It is an object of my invention to provide an adjustable speed driving mechanism which will have a wide range of speeds.

A further object is to provide a drive mechanism wherein the speed of the driven member will remain constant under a change in load, particularly at low speeds and light loads.

A further object is to increase the power delivered at intermediate speeds.

A further object is to provide a drive of the type described above wherein the load is divided between two motors.

A further object is to provide a novel dynamic braking arrangement.

Figure 1:
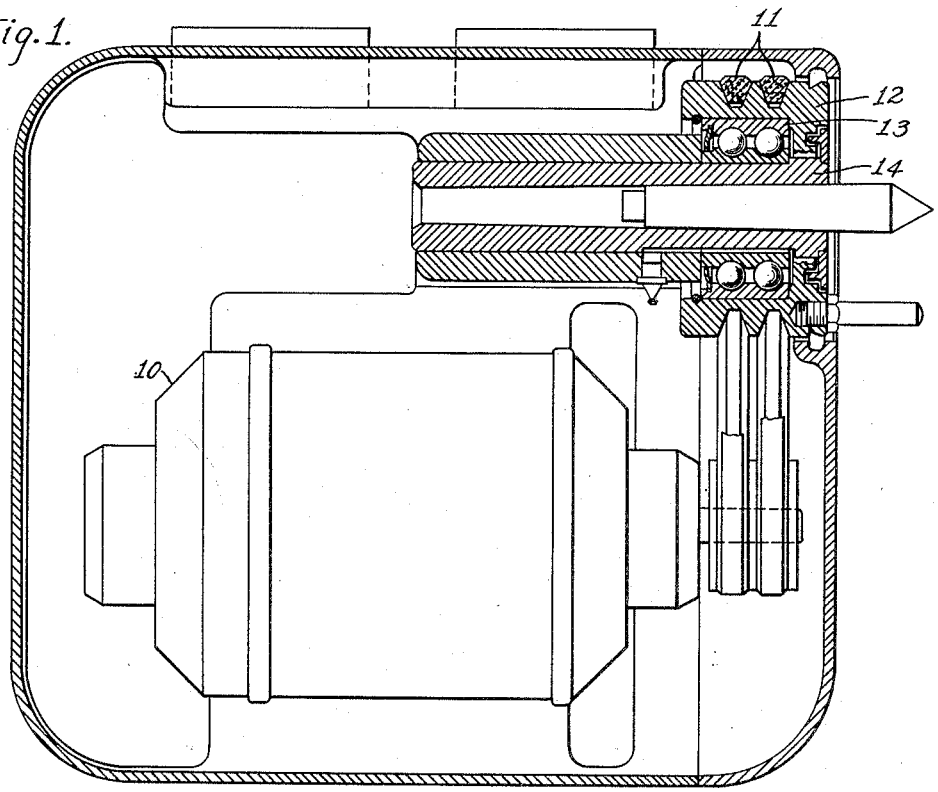
Figure 1 is a plan view, partly in section, showing one type of mechanism, a headstock drive, to which my invention has been applied.

In Figure 1 is shown a motor 10 driving directly, thru belts 11, the headstock face plate 12. Said face plate is rotatably mounted on an anti-friction bearing 13 on a non-rotatable spindle 14. Best results are obtained with this type of drive when friction in the driving parts is held at a minimum. This is discussed in detail in my hereinabove-identified co-pending application.

Figure 2:
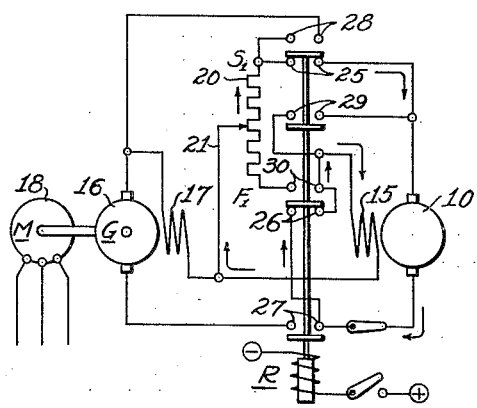
Figure 2 shows a wiring diagram of a series type variable voltage drive illustrating an arrangement for dynamic braking.

In Figure 2 is shown a wiring diagram which includes motor 10 having a series wound field 15 and a generator 16 having a series field 17. Both motor and generator have fields of low residual magnetism since it has been found that in the series type of variable voltage drive, the presence of normal, or a relatively high, residual magnetism results in unstable operation of the motor at low speeds and light loads. Also, it has been found desirable to make the motor and generator as nearly alike as possible. Said generator may be driven by any suitable means, in this case by a motor 18. The means for controlling the speed of the motor and the voltage output of the generator consists of an adjustable-resistance resistor 20 in parallel with the fields and connected at a point between the motor field and the generator field. Thus the resistor is effective on both fields. The control relay R has two normally closed contacts 25 and 26, and also four normally open contacts, 27, 28, 29 and 30. Contacts 25 and 26 complete a braking circuit across the armature of motor 10 and thru motor field 15 and a selected portion of resistor 20. Normally open contact 27 opens or closes the circuit between generator 16 and motor 10. Normally open contacts 28, 29 and 30 cut out those portions of the circuit which while necessary when the motor is running, would interfere with the braking operation. In this arrangement the value of the braking resistance is low at the low speed setting and high at the high speed setting.

When the starting relay R is energized, contacts 27, 28, 29 and 30 are closed and contacts 25 and 26 are opened. Current from generator 16 flows thru contact 27, motor 10, contacts 29 and at this point divides between motor field 15 and through contact 30 to resistor 20 and flexible lead 21. At flexible lead 21 the current again divides between generator field 17 to the generator and the upper portion of resistor 20 and closed contact 28 to the generator. Speed adjustment is effected by shifting flexible load 21 between the positions F and S indicating fast and slow speed. At the fast speed position most of that portion of the resistance in resistor 20 shunted around the motor field 15 is reduced and that portion shunted around generator field 17 is increased, thus weakening the motor field whereby to increase the speed of the motor and strengthening the generator field to increase the voltage output of the generator whereby to increase the motor speed.

At the low speed position, that is, any position nearer S₁, the resistance of resistor 20 in parallel with field 15 is increased and a greater portion of the current must thus pass thru motor field 15 thereby strengthening the field 15 and reducing the motor speed. At the same time the decrease in flow of current thru generator field 17 due to the decreased resistance of resistor 20 in parallel with field 17 weakens said field 17 and decreases the voltage output of the generator whereby to decrease the motor speed.

When the control relay R is deenergized, contacts 25 and 26 close and contacts 27, 28, 29 and 30 open. The motor field 15 is thus connected to be energized by the motor, since the motor momentarily becomes a generator and the path of the current generated thereby is thru contact 26, field 15, lead 21, a portion of resistor 20, and contact 25, back to motor 10. For the purpose of braking, the resistor and field are connected in series. At the high speed position the current generated by the motor must pass thru the entire length of the resistor and thus the current is limited and an abrupt stop is avoided. At the slow speed less voltage is generated but the resistance is also reduced, and thus uniform braking effect is obtained at all speeds.

Figure 3:
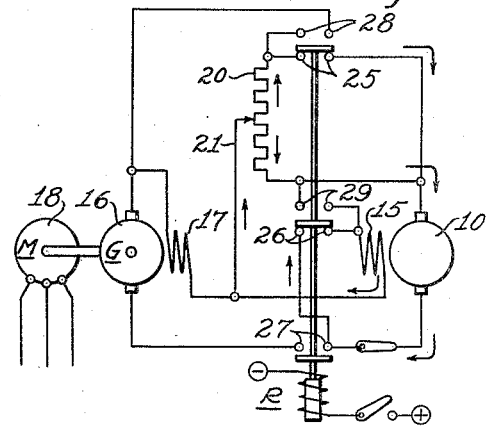
Figure 3 shows a wiring diagram of a series type variable voltage drive illustrating another arrangement for dynamic braking.

In Figure 3 is shown a diagram which is the same as Figure 2 so far as speed control is concerned, but which differs in braking characteristics. In this case the relay has only three normally open contacts, 27, 28 and 29. It has also the normally closed contacts 25 and 26. The motor field connection is the same, i. e., thru normally closed contact 26 to one side of the motor. The resistance 20 is connected directly to the other side of the motor. The effect of this arrangement is that the current generated by the motor when it reaches resistor 20 divides and returns to the motor directly and also thru normally closed contact 25, the division depending upon the speed setting of lead 21. This current will follow the line of least resistance and therefore there is never more than one-fourth of the total value of the resistor effective during the braking cycle. During the running period the resistor 20 functions normally and a maximum of resistance is available for controlling the speed of the motor.

Figure 4:
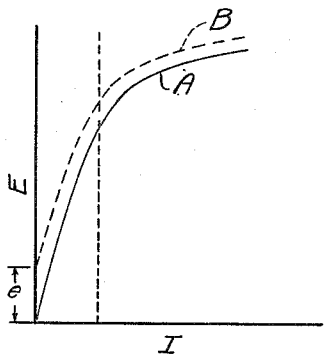
Figure 4 shows curves indicating the relation between generator voltage and motor load current with and without high residual magnetism in the field magnets.

Figure 4 shows a curve showing the difference due to residual magnetism in voltage-load curves for a series type variable voltage combination. Curve A represents the performance of my drive, the generator having very little residual magnetism. It will be noted from the curve A of Fig. 4 that the residual flux is less than 10% of the flux at no-load saturation. The dotted line curve B represents the performance of a conventional drive, the generator having a high residual magnetism. It should be noted that at light loads a substantially lower operating voltage is obtainable in the absence of a high residual magnetism.

Figure 5:
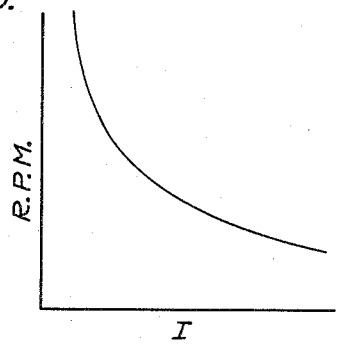
Figure 5 shows a curve indicating the relation between motor speed and motor load current for a series motor.

In Figure 5 is shown the speed-load curve for a conventional series motor, that is, one having high residual magnetism.

Figure 6:
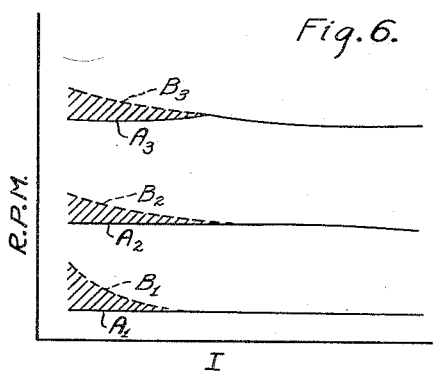
Figure 6 shows a series of curves indicating the relation between motor speed and motor load current for a series motor and series generator combination at different speeds with and without residual magnetism.

In Figure 6 is shown a series of speed-load curves $B_1$, $B_2$ and $B_3$ for a conventional adjustable speed series motor and series generator, and a series of speed-load curves $A_1$, $A_2$ and $A_3$ for an adjustable speed series motor and series generator having the features of my invention.

The dotted lines, namely curves $B_1$, $B_2$ and $B_3$ represent the performance, at different speeds, of the conventional generator used with a conventional series motor. The solid lines or curves $A_1$, $A_2$ and $A_3$ represent the performance of my series generator and series motor, and indicate a substantially constant speed for all loads for each speed setting. These curves correspond to curve A of Figure 4. The hatched portion of each pair of curves represents the difference in performance between my arrangement of low residual on the machines and the conventional arrangement of high residual magnetism on the machines.

Figure 7:
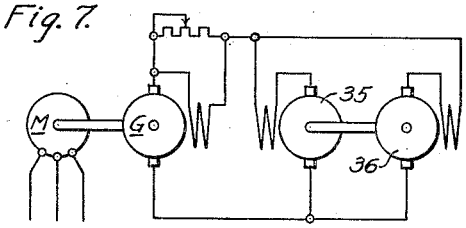
Figure 7 shows a wiring diagram wherein a given load is divided between two motors as where a work piece in a lathe or grinder might be driven by a motor at each end.
Figure 7A:
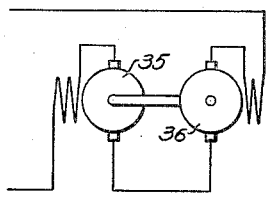
Figure 7A shows an optional arrangement wherein the drive motors are connected in series instead of in parallel.

One novel application of my invention is shown in Figure 7. In this case the only difference from Figures 2 and 3 lies in the fact that two or more mechanically connected motors, for example, 35 and 36, are used to rotate the heads of a crank grinder. These motors are connected in the circuit in series with the generator 37 and in parallel with each other. The purpose of this arrangement is to divide the load between the motors and so to drive from both ends of the work piece. By dividing the load evenly the work will not be subjected to twisting during rotation due to one motor assuming more of the load than the other. This equal division of load is true only in the case of series motors due to the load shirking characteristic as shown in Figure 5. A similar effect may be obtained if the motors are connected in series as shown in Figure 7A.

Figure 8:
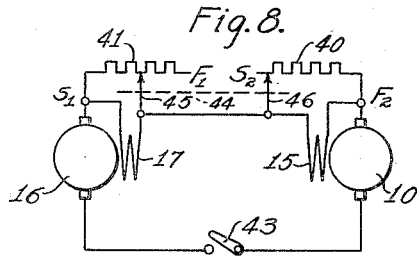
Figure 8 shows a wiring diagram for a series type variable voltage drive showing a novel speed control.
Figure 9:
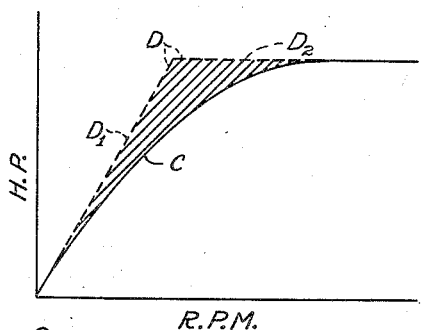
Figure 9 shows a performance curve for the arrangement shown in Figure 8.

In Figure 8 is shown a diagram which differs from Figures 2 and 3 in that it has no dynamic braking arrangement and has a different type of speed control. Generator 16 having a series field 17 is connected to motor 10 having a series field 15. A speed control resistor 40 is inserted in the circuit in parallel with motor field 15. A speed control resistor 41 is inserted in the generator circuit in parallel with generator field 17. The circuit between generator and motor may be opened and closed by switch 43 which may be actuated in any suitable manner. An operating arm 44 connected to the circuits of fields 15 and 17 engages and adjusts said fields successively. The immediate effect of this arrangement is that in going from slow to fast speed the maximum output of the generator is made available by gradually inserting by shifting arm 45, more and more sections of the resistor 41 after which additional speed control and a further range of speeds is obtained by adjusting arm 46 in relation to the resistor 40 to vary the excitation of motor field 15. The ultimate result of the use of this divided resistor is that a greater amount of power is made available at intermediate speeds as shown in Figure 9, in which curve C indicates the power output at different speeds with other, or prior art, types of speed control. Curve D indicates the additional power available at intermediate speeds when the divided resistor is used. That is, as arm 45 is moved from point S, toward point F, on resistor 41 the curve $D_1$ is obtained, and as the arm 46 is moved from $S_2$ to $F_2$ the curve $D_2$ is obtained.

Obviously the same results could be obtained so far as speed range and control are concerned by using with each of two independent resistors a separate operating arm. The operator could actuate first one arm as 45 over resistor 41 and then the other as 44 over resistor 40 to simulate the operation of the single arm.

I claim:

1. In combination an electrical circuit including a series motor having a magnetic circuit having low residual magnetism, a series generator having a magnetic circuit having a low residual magnetism, connections for supplying current from said generator to said motor, and means for controlling the speed of said motor including a resistor and means for adjusting the resistance value of said resistor connected in parallel to the generator series field winding, and switching means operable when the circuit between motor and generator is opened for including said resistor and the motor series field winding in the armature circuit of said motor whereby to effect dynamic braking of said motor.

2. In combination an electrical circuit including a series motor having low residual magnetism, a series generator having a low residual magnetism, connections for supplying current from said generator to said motor, means for controlling the speed of said motor including an adjustable resistor in parallel with the motor field, and means operable when the circuit between motor and generator is opened for including said adjustable resistor and the series field of the motor in series in the armature circuit of said motor whereby to effect dynamic braking of said motor.

3. In combination an electrical circuit including a series motor and a series generator, each having a low residual magnetism, connections for supplying current from said generator to said motor, means for controlling the speed of said motor including an adjustable resistor, a relay for controlling the circuit between said generator and said motor, normally closed contacts on said relay operable when the circuit between motor and generator is opened for including said adjustable resistor and the motor series field in the armature circuit of said motor whereby to effect dynamic braking of said motor.

4. In combination, a generator and a motor connected to said generator, both of said machines having series field windings only and also having magnetic circuits having relatively low residual magnetism of less than ten percent of the no-load saturation values of the respective machines, a resistor connected in parallel to both series field windings, and motor speed control means interconnecting adjacent junctions of the field windings with any point on the resistor, whereby, as the point of connection of the speed control means on the resistor is varied along the resistor the field strengths of the motor and generator are varied inversely and over a relatively greater range by reason of the low residual magnetisms of said fields.

5. In a variable speed drive for a machine, in combination, a direct current generator of the series type having a magnetic circuit constructed of material treated to have low residual magnetism of less than ten percent of saturation, an armature winding, and a series type field winding connected in series with the armature winding, an adjustable resistor connected in shunt relation to the field winding, a series motor for driving said machine, said motor being connected directly to the generator and having substantially the same size as the generator and having electrical circuit arrangements and electrical and magnetic characteristics substantially the same as those of the generator, and means for driving the generator.

6. The combination in an electrical circuit of a series motor and a series generator, each having a low residual magnetism of less than ten percent of no-load saturation, and means for adjusting the speed of the motor consisting of a resistor arranged in parallel to the generator series field, and means to vary the generator field magnet strength by shunting sections of said resistor to thus vary the voltage output of the generator.

7. In combination, a generator and a motor connected to said generator, both of said machines having series fields only and also having magnetic circuits having relatively low residual magnetism of less than ten percent of the no-load saturation values of the respective machines, a resistor disposed for connection in parallel with the field winding of the generator, a second resistor disposed for connection in parallel with the field winding of the motor, and motor-speed control means for interconnecting the common junction of said field windings with any point on one or the other of said resistors, whereby as the point of connection of the speed control means on said resistors is changed in one direction over one portion of its range of operation the effective resistance of the field and its associated resistor of one machine is varied in one sense while the effective resistance of the field and its associated resistor of the other machine remains constant and as the point of connection of said speed control means is changed in the said one direction over the remaining portion of its range of operation the effective resistance of the field and its associated resistor of the said one machine remains constant whereas the effective resistance of the field and its associated resistor of the other machine is varied in an opposite sense to the first mentioned sense of variation to thus obtain a relatively greater motor speed variation by reason of the low residual magnetism of said magnetic circuits.

ROBERT S. ELBERTY, Jr.